United States Patent [19]
Reid et al.

[11] Patent Number: 5,162,481

[45] Date of Patent: Nov. 10, 1992

[54] POLYURETHANEUREA COMPOSITION

[75] Inventors: Thomas S. Reid; Charles D. Wright, both of St. Paul, Minn.

[73] Assignee: Minnesota Mining and Manufacturing Company, St. Paul, Minn.

[21] Appl. No.: 750,440

[22] Filed: Aug. 20, 1991

Related U.S. Application Data

[63] Continuation of Ser. No. 502,333, Mar. 30, 1990, abandoned.

[51] Int. Cl.$^5$ ............................................. C08G 18/10
[52] U.S. Cl. ...................................... 528/48; 528/60; 528/64; 528/78; 528/79; 427/385.5; 428/423.1
[58] Field of Search .................... 528/48, 60, 64, 78, 528/79; 427/385.5; 428/423.1

[56] References Cited

U.S. PATENT DOCUMENTS 4,328,322  5/1982  Baron .................................... 528/68
5,002,806  3/1991  Chung .................................... 528/60

*Primary Examiner*—Maurice J. Welsh
*Attorney, Agent, or Firm*—Gary L. Griswold; Walter N. Kirn

[57] ABSTRACT

A substantially solvent-free two-part polyurethaneurea composition having excellent adhesion to elastomeric substrates, comprising the reaction product of a macrodiol endcapped with an oligomeric aromatic amine and a polyisocyanate or prepolymer. With selected compositions, curing can be effected in moist conditions, or even under water. The composition provides an excellent sealant or repair for elastomeric/rubberized articles such as waders, etc.

25 Claims, No Drawings

POLYURETHANEUREA COMPOSITION

This is a continuation of application Ser. No. 07/502,333 filed Mar. 30, 1990, now abandoned.

TECHNICAL FIELD

The invention described herein relates to a two-part polyurethaneurea adhesive composition displaying excellent adhesion to elastomeric substrates.

BACKGROUND ART

Various adhesive products are commercially available for asserted use as sealants or adhesives to repair or patch polymeric elastomeric materials such as natural rubber, plasticized polyvinyl chloride, polychloroprene and the like. Such materials are typically used in a variety of outdoor recreation articles, such as tents, rubber boots, waders, inflatable objects (e.g., rafts, inner tubes), etc. These articles are used in a variety of environmental conditions, including high humidity and rain, and are often subject to abrasion or other potentially deleterious conditions.

Many of the commercially available adhesive compositions for use with such materials are high-solvent content polyurethanes, polyvinyl chloride, or rubber blends. Such adhesives are, however, not individually suitable for use with a wide variety of polymeric substrates. Some, for example, have extended cure times which means a repaired item may not be available for use for many hours or even days. When exposed to environmental extremes or high moisture conditions, some form only weak adhesive bonds to certain substrates and others fail to form any bond at all. Additionally, some of these products contain solvents which can cause detrimental foaming or bubbling while curing, and which present certain health and environmental hazards. When the product is a two-part adhesive system, formation of useful bonds may require close measurement, which may be problematic for the user under various environmental and field conditions. Further, some, like conventional rubber cement, may require a separate patch to be useful. For good bonding to rubber, vulcanization is typically required to achieve a satisfactory bond.

It is therefore desirable to provide an adhesive composition capable of curing at ambient temperatures; eliminating the necessity for solvents and the problems associated therewith; and forming useful bonds in about one hour and strong bonds in 24 hours or less.

In addition, when a preferred excess of NCO stoichiometry is utilized, the composition is capable of adhering strongly to a variety of polymeric/elastomeric substrates, even in the presence of moisture and environmental extremes; forming useful bonds despite inaccurate component measurements, if required; curing in contact with, or even submerged in, water; and forming a high strength flexible elastomer itself upon curing.

Polyurethanes have many practical applications as foams, elastomers, adhesives, coatings and sealants. Polyurethane adhesives typically involve the catalyzed reaction of hydroxyl-terminated oligomers (i.e., polyols) and di- or polyisocyanates. However, exposure of polyurethane adhesive compositions to water or moisture conditions often causes an unsatisfactory reduction in adhesive bond strength. Additionally, catalysts for the polyol/isocyanate reaction often also catalyze a water/isocyanate reaction, thus causing bubbling and foaming when used in wet or high humidity conditions or when applied to wet substrates.

Polyureas are obtained by the polyaddition of substantially equivalent amounts of polyisocyanates and polyamines (especially diamines) having terminal amino groups, typically resulting in rigid compositions upon curing. Such materials are typically used for injection molding of automotive parts, where fast cure and short cycle times are desired, and for molding rigid articles, such as skate wheels and ski boots. However, polyureas generally are not suitable for formulating room temperature curable liquid compositions.

Polyurethaneureas are formed by first preparing an isocyanate-terminated prepolymer from a macrodiol, such as a polyester diol or a polyetherdiol, using excess polyisocyanate, resulting in a prepolymer having isocyanate end groups. This prepolymer is in turn reacted with polyamines to yield polyurethaneureas. Such materials are characterized by alternating mobile soft segments, which provide flexibility, and hard segments, which contribute to cohesive strength and sometimes to adhesive strength.

U.S. Pat. No. 4,663,201 discloses a method of coating an object with a polyurea resulting from the reaction of a polyisocyanate having at least three isocyanate moieties with from about 0.8 to 1.2 equivalents of a sterically hindered secondary aromatic diamine.

U.S. Pat. No. 3,817,940 discloses a synthetic polymer produced by the polyaddition reaction of about 0.9 to about 1.2 equivalents of polyisocyanate per equivalent of an ortho-substituted aminobenzoic acid ester or amide, i.e., a diamine. Such diamines are solid at room temperature, and thus would be very difficult to use in field conditions.

U.S. Pat. No. 4,345,058 discloses a urethane prepolymer repair system provided by an isocyanate-terminated prepolymer of polytetramethylene glycol in a solvent. It is believed this material is sold commercially as "Aquaseal." This product cures slowly over a 48 hour period, so it is not highly useful for field use or quick repair. Bubbles can also form due to the solvent or to carbon dioxide formed while the material is still soft. After final cure, the material exhibits good adhesion and abrasion resistance.

U.S. Pat. No. 4,578,446 and U.S. Pat. No. 4,714,512 disclose polyurethanes made from isocyanate-terminated prepolymers and sterically hindered liquid aromatic diamines. It is very difficult to formulate repair materials with a convenient 1:1 mix ratio from these materials. These aromatic diamines are not oligomeric and also tend to be very dark in color.

U.S. Pat. No. 4,328,322 discloses a polyurea polymer formed from the reaction of essentially equivalent amounts of low molecular weight polyisocyanates and oligomers terminated with p-aminobenzoate. The use of isocyanate prepolymers is not disclosed nor is the use of excess equivalents of isocyanate to amine, which allows for formation of useful bonds despite inaccurate measurements. In the working examples, a 4:1 mix ratio is described, which results in high tensile strength polyureas.

By use of polyisocyanate-terminated prepolymers and/or a liquid polyisocyanate, combined with oligomeric amines, the resulting cured polymers of the invention exhibit improved flexibility and adhesion to polymeric or rubbery substrates, fulfilling the needs discussed previously.

SUMMARY OF THE INVENTION

The substantially solvent-free two-part polyurethaneurea adhesive of the invention comprises the reaction product of a macrodiol derived or macrodiamine derived oligomeric aromatic amine and a polyisocyanate and/or polyisocyanate prepolymer, the polyisocyanate and/or prepolymer being present at between about 0.90 to 2.6 equivalents per equivalent of the amine (I/A). At least one urethane linkage must be present in the mixture. At significantly less than a stoichiometric amount of isocyanate (i.e., less than about 0.9 I/A), the composition may be slower curing and may never become totally tack-free. At a ratio greater than about 2.6, the composition may tend to be more rigid and less elastomeric. Thus, preferably the ratio is from about 1.0 to 2.6 I/A, and more preferably about 1.1 to 2.6 I/A.

The volume mix ratio of the two components is not critical, and a mix ratio of from about 1:1 to 2:1, by volume, based on either component, can be tolerated.

The polyaddition reaction can proceed without a catalyst. However, the reaction may be catalyzed by protonic acids, Lewis acids, organometallic compounds, etc. The latter are commonly used to catalyze hydroxyl/isocyanate reactions.

Upon curing, the composition results in a tough, rubbery polymer, capable of forming a strong bond with a variety of polymeric elastomeric materials, including natural rubber, plasticized polyvinyl chloride, polychloroprene (commonly known as "Neoprene"), chlorosulfonated polyethylene and the like, the bond normally exceeding the strength of the polymeric substrate itself.

When a stoichiometric excess of polyisocyanate is present, the composition will form useful bonds even if the components are inaccurately measured. The polyurethaneurea will cure to form a strong polymeric patch or seal at ambient temperatures. Surprisingly, the adhesive composition will form useful bonds even when exposed to high moisture conditions during cure. Further, the substantially solvent-free adhesive composition cures basically free of bubbles to a tough flexible elastomer. In high humidity environments, some bubbling can occur, but it is insufficient to be detrimental to the bond formed.

The composition is particularly well suited for repairing rubber or rubberized products, such as waders. For example, one can apply the composition to effect a patch, and within a relatively short time re-enter a stream or lake. The adhesive bond can continue to cure even after immersion in water, thus forming a watertight patch.

DETAILED DESCRIPTION

Useful oligomeric aromatic amines have the following formula:

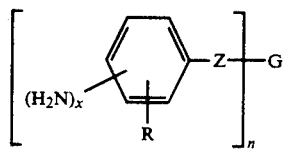

wherein n is an integer of from 2 to 4; each x is one or two; each phenyl nucleus is para-amino, meta-amino, or di-meta-amino- substituted; each Z is

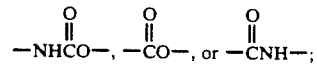

each R is hydrogen or lower alkyl, i.e., 4 carbon atoms or less; and G is an n-valent radical which may be obtained by the removal of hydroxyl or amino groups, respectively, from an n-valent polyol or polyamine having a molecular weight of from about 250 to about 6,000. Below a molecular weight of about 250, it will be difficult to achieve the desired flexibility in the cured adhesive. Above about 6,000, the oligomeric amine could be solid and thus harder to dispense, especially in field applications.

The oligomeric aromatic amines are of two classes: aminobenzoic acid esters or amides where Z is

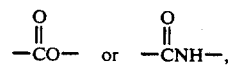

and aminophenyl urethanes where Z is

Oligomeric aminobenzoic acid esters can be conveniently provided by reaction of a nitro-substituted benzoyl halide or benzoic acid, with a suitable polyol, such as a polyalkylene ether polyol, polyester polyol, or hydrocarbon polyol, e.g., polybutadiene and castor oil, followed by reduction of the nitro groups of the resulting product to the corresponding amino groups.

Examples of polyalkylene ether glycols include polypropylene glycol, polytetramethylene ether glycol, and poly 1,2 butylene ether glycol. Polyethylene glycol can only be copolymerized up to about 40 weight percent, since the system will tend to become water-sensitive and lose adhesion. Examples of polyester glycols include polybutylene adipate and polyethylene adipate.

Preferably, the oligomeric polyamine is a substantially difunctional amino benzoic acid-terminated oligomer with a polytetramethylene ether backbone, having a total molecular weight of about 800 to 1300, or mixtures of such polyamines having molecular weights from about 800 to about 1300.

In like manner, oligomeric aminobenzoic acid amides useful herein can be obtained by reaction of a nitro-substituted benzoyl halide or benzoic acid with a suitable polyamine, followed by a reduction of the nitro groups of the resulting product to corresponding amino groups.

Preparation of oligomeric aromatic amines useful in the invention is described in detail in U.S. Pat. No. 4,328,322, incorporated herein by reference. Examples of suitable oligomeric aromatic amines include "Polamine" 1000 and "Polamine" 650, commercially available from Air Products and Chemicals.

Oligomeric aminophenyl urethanes, i.e., where Z is

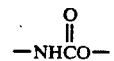

and R is CH$_3$, can be provided by first reacting a polyol, such as polypropylene glycol, with an aromatic diisocyanate to form an isocyanate-terminated prepolymer, followed by reducing the isocyanate group to an amine group. A commercial example of this class is "Desmophen" TPLS 2919, commercially available from Mobay Chemical Company. These oligomeric aromatic diamines can be used alone or in combination with each other.

U.S. Pat. Nos. 3,808,250; 3,817,940; 3,929,803; 3,975,428; 4,169,206; and 4,174,455 disclose oligomeric ortho anthranilates with various backbones. These patents concentrate on the preparation of these oligomers and no disclosures are made to adhesives or to moisture-curing adhesives with excess isocyanate content. The oligomers which are liquid at room temperature are useful in the amine portion of the adhesives of this invention and are herein incorporated by reference.

Polyisocyanates useful in the adhesive include a variety of aromatic di- and poly- isocyanate materials conventionally employed in the production of polyurethanes, examples being those derived from methylene dianiline, toluene diamine, naphthalene diamine and other aromatic diamines; aliphatic di- and polyisocyanate materials; and oligomeric prepolymers from methylene diisocyanate, toluene diisocyanate, aliphatic polyisocyanates and polyols containing polypropylene ether backbones, polytetramethylene ether backbones, polybutylene ether backbones, polyester backbones and hydrocarbon backbones, such as castor oil, poly 1,4-butadiene, and dimer and trimer polyols and mixtures thereof. The isocyanate-functional prepolymer (hereafter sometimes referred to as the "prepolymer") contains sufficient isocyanate groups to enable the composition to be cured or polymerized upon exposure to atmospheric or added moisture. Suitable prepolymers are described in U.S. Pat. Nos. 3,707,521; 3,779,794; 4,511,626; 3,723,163 and 4,502,479 (the disclosures of which are incorporated herein by reference), as well as in "Urethane Polymers," Kirk-Other Encyclopedia of Chemical Technology, 3rd Edition, 23, 576–608 (1983) and in the references cited therein. Other suitable prepolymers will be familiar to those skilled in the art of manufacture of moisture-curable urethane compositions.

The prepolymers are made using conventional methods. Typically, they are prepared by reacting an excess of one or more polyisocyanates with one or more polyols to produce a substantially linear prepolymer having residual isocyanate functionality.

Examples of suitable polyisocyanates include the toluene diisocyanates (TDI) such as 2,4-toluene diisocyanate and 2,6- toluene diisocyanate; mixtures of TDI isomers such as a mixture (80/20 or 65/35 by weight) of 2,4-toluene diisocyanate and 2,6-toluene diisocyanate; tetramethylene diisocyanate; hexamethylene diisocyanate; xylene diisocyanate; 1,5-naphthylene diisocyanate; 1,4-phenylene diisocyanate; 4,4'-diphenylmethane diisocyanate (MDI); 4,4'4''-triphenylmethane triisocyanate; and 3,3'-dimethyl-4,4'-diphenylmethane diisocyanate. Aliphatic diisocyanates such as the C-36 aliphatic diisocyanate derived from the dimer of ricinoleic acid can be suitably employed and are commercially available, an example being DDI-1410 (Henkel Corporation). The polyisocyanates herein are known polyisocyanates in the field of polyurethane technology and can be employed singly or in admixture.

Preferred polyisocyanates for employment in the present invention are those in liquid form at ambient temperatures. These materials facilitate the production of easy to use adhesives when combined with normally liquid oligomeric polyamines and obviate the requirement of melting a solid polyisocyanate as a prerequisite to providing a suitable reaction mixture. Suitable liquid polyisocyanates are known and include, for example, polymeric MDI (4,4'- diphenylmethane diisocyanate products obtained as by-products from the synthesis of MDI) and MDI containing a small amount of prepolymer. Examples of useful material are "Isonate" 181, commercially available from Dow Chemical, "Lupronate" M, commercially available from BASF Wyandotte Corporation, and "Rubinate" PBA 2225, commercially available from ICI Chemicals.

Although the polyaddition reaction can proceed without a catalyst, the reaction speed is increased by their use. Examples of suitable catalysts include organometallic compounds, protonic acids, and Lewis acids. Adipic acid, a protonic carboxylic acid, preferentially catalyzes the amine/isocyanate reaction rather than the reaction with water, allowing for formulation of useful bonds even in water or under moist conditions. For adhesive applications in moist or wet conditions, it is preferable that an acid catalyst be used, to avoid the rapid water/isocyanate reaction.

Carboxylic acids catalyze the amine-isocyanate reaction rather than the reaction with water. For example, without catalyst, cure time to a tack free polymer may be three hours. When adipic acid was used as a catalyst, the cure time ranged from 30 to 5 minutes to a tack free state depending on the catalyst concentration.

Certain amine and isocyanate formulations may tend to crystallize when stored at temperatures below 0° F., making dispensing and mixing difficult. If warmed to room temperature before dispensing, some formulations do not fully return to their original liquid state. Surprisingly, this problem can be solved for the amine portion by the addition of small amounts of a lower molecular weight polyamine such as "Polamine" 650 available from Air Products and Chemicals, which has a molecular weight of about 800. For the isocyanate component, crystallizing prepolymers of intermediate molecular weight are not preferred, but can be utilized. Crystallization of some prepolymers can be reduced by adding liquid MDI, heretofore described. Addition of a liquid plasticizer and/or a solvent has also been found to solve the problem of crystallization.

The formulations may also contain fillers, plasticizers, and thixotropic agents such as clay, calcium carbonate, and silica; colorants, UV absorbers and adhesion promoters to produce desired resultant properties. For instance, "Cab-O-Sil" TS-720, available from Cabot Corporation, a high surface area synthetic silica precoated with a silicone oil, helps impart non-sag properties to the adhesive.

In the two-part adhesive of the invention, the polyisocyanate and/or prepolymer is present in an amount between about 0.90 to 2.6 equivalents per equivalent of oligomeric aromatic amine. Within the foregoing range of mole equivalents, there is considerable latitude in formulation. For practical purposes, it has been found that a mix ratio of 1:1 to 2:1, by volume, based on either component, is acceptable, thus permitting easy estimation of amounts.

The pot life, herein defined as the time, after mixing, after which the composition no longer spreads easily onto a substrate, can vary depending on component concentration. Preferably, the pot life is less than 10 minutes.

The invention is further described in the following specific examples, provided by way of illustration, and not to be construed as limiting.

ARATION OF MDI PREPOLYMER

This prepolymer was prepared by reacting 13.7 parts of MDI; 19.7 parts NIAX LHT 28 polyol, a 6000 molecular wt. polyol available from Union Carbide Corp; 46.9 parts of "Terathane" 2000, a polytetramethylene ether diol of molecular weight of 2000 available from Du Pont (or from Quaker Oats as "Polymeg" 2000); 9.40 parts HB-40, a plasticizer available from Monsanto Corp.; and 9.9 parts of VMP naphtha, a petroleum distillate available from Union Oil Company. The reaction is carried out in 1 atmosphere of dry nitrogen at 60° C. for 3 hours. The Brookfield viscosity should be about 13,000 cps. and the NCO equivalent weight should be from 1800 to 2000 (Prepolymer 1).

Another MDI prepolymer useful in the invention can be prepared by heating "NIAX" LHT 28 and MDI until liquid with stirring, then adding "Terathane" 2000 and HB-40, heating to 60° C for 2 hours, then dumping into metal containers flushed with nitrogen and sealed tightly. This prepolymer contains no solvent.

EXAMPLE 1

An adhesive composition was prepared as follows: Part A was prepared by mixing "Polamine" P-1000 (92.0 wt. %), an oligomeric diamine available from Air Products and Chemicals; adipic acid catalyst (2.5 wt. %); and "Cab-O-Sil" TS-720, a silica available from Cabot Corporation (5.5 wt. %). Part B was prepared by mixing "Rubinate" PBA-2225, a methylene diisocyanate available from ICI Chemicals, (78.1 wt. %), "Adiprene" L-100 (14.6 wt. %), a prepolymer of polytetramethylene ether polyol and TDI, available from Uniroyal, and "Cab-O-Sil" TS720 (7.3 wt. %). Parts A and B were mixed at a ratio of 20 g Part A to 10.6 g Part B, representing an equivalent or mole ratio of 2.0/1 isocyanate to amine (I/A). The adhesive composition had a pot life of 5-10 minutes, rapidly developing useful green strength, and cured over a period of two days to a very tough adherent coating.

The performance of the adhesive of Example 1 was compared with that of various commercially available adhesive compositions: "Goop"—Eclectric Products, Inc; "Barge Cement"—Pierce and Stevens Chemical Corp.; "Aquaseal"—D. V. McMett and Co.; "Duro" (a vinyl adhesive)—Loctite Corp.; "Shoe Goo" II—Eclectric Products Inc.; and "Rubber Cement" (patch)—Vicor Automotive Products Inc.

The adhesive of Example 1 and the commercial products were applied to natural rubber, "Neoprene" and polyvinyl chloride, the three materials most often used for waders and like products. The surfaces were cleaned with abrasive paper ("Wetordry" 180, available from the 3M Company) before the adhesive compositions were applied. The samples were allowed to cure for 24 hours at room temperature. The strength of the adhesive bond was evaluated by manually attempting to remove or separate the adhesive film from the substrate with a spatula. The results are presented in Table 1 below.

TABLE 1

| | Substrate | | |
|---|---|---|---|
| Sample | Natural Rubber | Neoprene | Polyvinyl Chloride |
| Ex 1 | good (1) | good | good |
| Goop (PU)* | fair (2) | poor (3) | fair |
| Barge (Neoprene) | fair | poor | poor |
| Aquaseal (PU)* | fair | poor | poor |
| Duro (PVC)** | poor | very poor (4) | poor |
| Rubber Cement (elastomer) | fair | poor | poor |

*polyurethane
**polyvinyl chloride
(1) good = strong adhesive bond; does not separate from substrate
(2) fair = adhesive film partially separated
(3) poor = adhesive readily separated from substrate
(4) very poor = no adhesive interaction between substrate and adhesive film

EXAMPLE 2

A two-part adhesive composition was prepared as follows: Part A was prepared by mixing 250 g (94.3%) of "Polamine" 1000, 4 g (1.5%) of adipic acid and 11 g (4.2%) "Cab-O-Sil" TS-720. Part B was prepared by mixing 342 g (78.1%) of "Rubinate" PBA-2225, 64 g (14.6%) of "Adiprene" L100, and 32 g (7.3%) of "Cab-O-Sil" TS-720. The two parts were mixed in a 2:1 mix ratio by weight yielding an adhesive composition with a 1.97 I/A equivalency ratio. The pot life was between 5 and 10 minutes.

The composition was applied to the following substrates: chlorosulfonated polyethylene ("Hypalon"), leather, canvas, aluminum, steel, stainless steel and wood. The adhesive composition was allowed to cure at room temperature for 24 hours and tested for adhesive strength by trying to scrape off or separate the adhesive composition from the substrate with a spatula. The material could not be removed from any of these surfaces.

EXAMPLE 3

An adhesive composition was prepared by mixing Part A and Part B prepared according to Example 2 in a 3.1:1 mix ratio by weight to obtain a 1.27 I/A equivalency ratio. Pot life was five to ten minutes. The mixture was applied to natural rubber and plasticized vinyl chloride substrates and allowed to cure for 24 hours at room temperature. The resultant adhesive film was a tough polymer that adhered well to both substrates.

EXAMPLE 4

An adhesive composition was prepared by mixing Part A and Part B of Example 2 in a mix ratio of 2.5:1 by weight to provide a 1.58 I/A equivalency ratio. The working pot life was again five to ten minutes. The mixture was applied to natural rubber and plasticized vinyl chloride and allowed to cure for 24 hours. The resultant adhesive film was a tough polymer that adhered well to both substrates.

EXAMPLE 5

An adhesive composition was prepared by mixing Parts A and B of Example 2 in a mix ratio of 1.5:1 by weight to provide a 2.63 I/A equivalency ratio. The mixture was applied to natural rubber and plasticized polyvinyl chloride and allowed to cure for 24 hours. The resultant adhesive film was a tough polymer that adhered well to both substrates.

EXAMPLE 6

An adhesive composition was prepared by mixing 120 g "Polamine" 1000, 2 g, "Empol" 1010, dimer acid commercially available from Emery, and 3.5 g "Cab-O-Sil" TS-720 as Part A. Part B was prepared by mixing 48 g of Prepolymer 1 described hereinabove, 48 g of ME-090, (MDI prepolymer) available from Mobay Chemical Corp., and 24 g "Rubinate" PBA-2225. Parts A and B were mixed together in a 1:1 by weight mix ratio, a 1.7 I/A equivalency ratio, yielding an adhesive having a pot life of about 5 minutes. The composition cured to a tough flexible polymer having very good adhesion to rubber and plasticized polyvinyl chloride.

EXAMPLE 7

An adhesive composition was prepared by mixing 0.67 g of Part B and 1 g of Part A by weight of Example 6 together to provide a 1.1 I/A equivalency ratio. The mixture had a pot life of 5 minutes and cured over 24 hours at room temperature to a strong flexible film having good adhesion to natural rubber and plasticized polyvinyl chloride. The adhesive could not be scraped from either substrate with a spatula.

EXAMPLE 8

An adhesive composition was prepared by mixing 1 g Part B and 0.67 g Part A of Example 6 to provide a 2.5 I/A ratio. The mixture had a pot life of 5 minutes. After curing for 24 hours at room temperature, the resulting polymeric material was strong and flexible. Adhesion to natural rubber and plasticized vinyl was very good.

Examples 7 and 8 illustrate the tolerance for a reasonable amount of mixing error provided by the use of a stoichiometric excess of isocyanate in the adhesive formulation.

EXAMPLE 9

A composition was prepared and tested as in Example 8, at a mix ratio of 1:1 by weight or volume (since the specific gravities were almost identical), an I/A equivalence ratio of 1.4 using the following:

| Part A: Amine Part | Amount | Percent by Weight |
|---|---|---|
| "Polamine" 1000 | 252 g | 87.5 |
| "Polamine" 650 | 14 g | 4.9 |
| "Empol" 1010 | 14 g | 4.9 |
| "Cab-O-Sil" TS720 | 8 g | 2.7 |
|  | 288 g | 100.0 |

The viscosity was 50,000 cps at 72° F, as measured with a Brookfield Viscometer, number 7 spindle, at 20 rpm. The specific gravity was 1.06.

| Part B: Isocyanate Part | Amount | Percent by Weight |
|---|---|---|
| MDI Prepolymer 1 | 218.2 g | 69.9 |
| "Rubinate" PBA-2225 | 81.8 g | 26.2 |
| "Cab-O-Sil" TS720 | 12.0 g | 3.9 |
|  | 312.0 g | 100.0 |

The viscosity was 47,000 cps when measured as above, and the specific gravity was 1.07. Similar results to Example 8 were obtained, the pot life of the mixture being 8 minutes.

Equal parts by volume of Parts A and B were then mixed and also tested as an adhesive. Overlap shear bonds were made and tested, the overlap being 12.5 mm × 25 mm. The bond line thickness was 0.13 mm and was controlled by adding a few glass beads of 0.13 mm size. The overlap shear substrates were 2.5 cm × 10 cm. The thickness is described below. The wood samples were bonded as received. The aluminum was etched using a conventional chromic acid system. The steel was wiped with a clean cloth and methyl ethyl ketone, abraded with 220 grit sandpaper and wiped with acetone. About ⅓ atmosphere of pressure was applied to the bond during the cure.

T-Peel bonds were tested using a tensile tester with a jaw separation rate of 25 cm/minute. The overlap shear bonds were tested at 4 mm/minute.

| OVERLAP SHEAR: MPa (Mega Pascals) | |
|---|---|
| Oak (after 3 days at 22° C.) | 7.6 |
| Fir (after 3 days at 22° C.) | 6.7 |
| (partial delaminiation or failure of the wood sample itself was noted) | |
| Maple (after 3 days at 22° C.) | 8.3 |
| ALUMINUM, ETCHED | |
| (after 3 days at 22° C., test at 22° C.) | 3.1 |
| (after 3 days at 22° C., test at 82° C.) | 1.3 |
| (after 3 days at 22° C. plus 3 days at 71° C./100% RH) | 1.9 |
| STEEL, CLEANED AND ROUGHENED | |
| (after 3 days at 22° C., test at 22° C.) | 3.1 |
| (after 3 days at 22° C., test at 82° C.) | 1.0 |
| (after 3 days at 22° C. plus 3 days at 71° C./100% RH) | 1.7 |
| T-PEEL, DECA NEWTONS/25 MM. | |
| 0.81 mm thick aluminum 0.13 mm thick bond - 3 days at 22° C. | 21 |
| 0.56 mm thick steel 0.13 mm thick bond - 3 days at 22° C. | 26 |
| 0.81 mm thick steel 0.13 mm thick bond - 3 days at 22° C. | 47 |

The foregoing data demonstrate good adhesive properties to wood, steel and aluminum, in addition to the flexible substrate discussed above.

EXAMPLE 10

A two-part adhesive composition was prepared and tested as in Example 8 with a 1:1 weight ratio using the following components:

|  | Amount | Percent by Weight |
|---|---|---|
| Part A: Amine Part | | |
| "Polamine" 1000 | 0.95 g | 95.0 |
| "Empol" 1010 | 0.05 g | 5.0 |
|  | 1.00 g | 100.0 |
| Part B: Isocyanate Part | | |
| ME090 (MDI Prepolymer) | 1.0 g | 100.0 |

The pot life of the mixed composition was about 5 minutes. The composition became tack-free in about 30 minutes. After overnight (about 16 hours) at room temperature, the composition cured to a tough flexible polymer having good adhesion to plasticized polyvinyl chloride and fair adhesion to natural rubber.

What is claimed is:

1. A flexible, elastomeric substrate adherent, polyurethaneurea formed from the reaction of
   (a) a macrodiol derived or macro-diamine derived amine, contained in a room temperature liquid first component, and (b) a polyisocyanate prepolymer alone, or in combination with, a polyisocyanate contained in a room temperature liquid second component;
wherein at least one urethane linkage is present in said first or second component, the equivalents of isocyanate per equivalent of amine is between about 0.9 and about 2.6, said amine of said first component and said prepolymer or prepolymer/polyisocyanate of said second component providing a reaction mixture capable of curing at room temperature.

2. The composition of claim 1 wherein said amine has the formula:

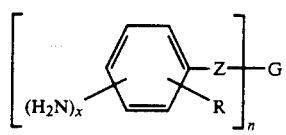

wherein n is an integer of from 2 to 4; each x is one or two; each phenyl nucleus is para-amino, meta-amino, or di-meta-amino- substituted; each Z is

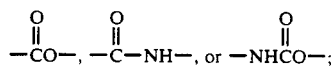

R is hydrogen or lower alkyl, and
G is an n-valent radical which is obtained by the removal of hydroxyl groups or amino groups, respectively, from an n-valent polyol or polyamine having a molecular weight of from about 250 to about 6,000.

3. The composition of claim 2 wherein said amine is selected from the group consisting of aminobenzoic acid esters and aminobenzoic acid amides and Z is

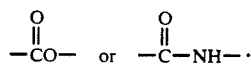

4. The composition of claim 2 wherein said amine is an aminophenyl urethane and Z is

5. The composition of claim 2 wherein said amine is a difunctional amino benzoic acid-terminated oligomer with a polytetramethylene ether backbone.

6. The composition of claim 5 wherein said amine has a molecular weight of from about 800 to about 1300.

7. The composition of claim 1 containing an excess of equivalents of isocyanate per equivalent of amine.

8. The composition of claim 1 wherein said polyisocyanate is 4,4'-diphenylmethane diisocyanate.

9. The composition of claim 1 further containing a catalyst that preferentially catalyzes an amine/isocyanate reaction relative to a water/isocyanate reaction.

10. The composition of claim 9 wherein said catalyst is a carboxylic acid.

11. The composition of claim 10 where said acid is adipic acid.

12. The composition of claim 1 further containing a thixotropic agent.

13. The composition of claim 1 wherein said first and second components are present at a volume ratio of from about 1:1 to 2:1 based on either component.

14. The composition of claim 1 wherein said reaction mixture consists essentially of said amine and said prepolymer alone or in combination with said polyisocyanate.

15. The composition of claim 1 wherein said reaction mixture is substantially free of polyol.

16. The composition of claim 1 having a pot life of no greater than about 10 minutes.

17. A flexible, elastomeric substrate adherent polyurethaneurea formed from the reaction of
(a) a oligomeric aromatic polyamine; and
(b) a polyisocyanate terminated urethane prepolymer alone, or in combination with, a polyisocyanate,
wherein at least one of said polyamine and said prepolymer or prepolymer/polyisocyanate contain at least one urethane linkage and are present in ratios to provide upon reacting (a) and (b) a cured polyurethaneurea.

18. A method for sealing an aperture in a polymeric elastomeric material comprising:
(a) applying a room temperature curable composition over said aperture and onto adjacent surface of said polymeric elastomeric material, said composition comprising:
(1) an oligomeric aromatic polyamine, and
(2) a polyisocyanate terminated urethane prepolymer alone or in combination with a polyisocyanate
wherein at least one of said polyamine, polyisocyanate, or prepolymer contain at least one urethane linkage and are present in ratios to provide upon reaction of (1) and (2) a cured polyurethaneurea polymer capable of sealing said polymeric elastomeric material, and
(b) curing said composition to seal said aperture.

19. The process of claim 18 wherein there is present a catalytic amount of a catalyst that preferentially catalyzes an amine/isocyanate reaction relative to a water/isocyanate reaction and said curable composition has a pot life less than about 10 minutes at room temperature.

20. A method for sealing an aperture in a polymeric elastomeric material comprising:
(a) applying a room temperature curable composition to locations on said patch and said polymeric elastomeric material to bond said patch to said elastomeric material in sealing relationship to said aperture, said curable composition comprising:
(1) an oligomeric aromatic polyamine, and
(2) a polyisocyanate terminated urethane prepolymer alone or in combination with a polyisocyanate,
wherein at least one of said polyamine, polyisocyanate, or prepolymer contain at least one urethane linkage and are present in ratios to provide upon reaction of (1) and (2) a cured polyurethaneurea polymer capable of bonding said patch to said polymeric elastomeric material, and
(b) curing said composition to provide a patched seal over said aperture.

21. An article comprising a polymeric elastomeric surface bearing a sealant composition, said sealant composition comprising a cured polyurethaneurea polymer formed from a reaction of (1) an oligomeric aromatic polyamine and (2) a polyisocyanate terminated urethane prepolymer alone or in combination with a polyisocyanate wherein at least one of said reactants contains at least one urethane linkage.

22. The article of claim 21 further comprising in the reaction mixture a catalytic amount of a catalyst that preferentially catalyzes an amine/isocyanate reaction relative to a water/isocyanate reaction.

23. A method for making an article having at least a portion of its surface composed of a polymeric elastomeric material having a sealed aperture therein comprising:
  (a) applying a curable composition over said aperture onto adjoining polymeric, elastomeric material, said composition comprising:
    (1) an oligomeric aromatic polyamine, and
    (2) a polyisocyanate terminated urethane prepolymer alone or in combination with a polyisocyanate,
    wherein at least one of said polyamine, polyisocyanate or prepolymer contain at least one urethane linkage and are present in ratios to provide upon reaction of (1) and (2) a cured polyurethaneurea polymer capable of sealing said aperture, and
  (b) curing said composition to seal said aperture.

24. A kit comprising first and second parts in unreactable combination, said first part comprising
  (a) a oligomeric aromatic polyamine; and said second part comprising:
  (b) a polyisocyanate terminated urethane prepolymer alone or in combination with a polyisocyanate;
  wherein at least one of said polyamine, polyisocyanate, or prepolymer contain at least one urethane linkage and are present in ratios to provide upon mixing and reacting said first and second parts a cured polyurethaneurea polymer sealant for polymeric elastomeric materials.

25. The kit of claim 24 wherein at least one of said first and second parts includes a catalytic amount of a catalyst that preferentially catalyzes an amine-isocyanate reaction relative to a water/isocyanate reaction.

* * * * *

UNITED STATES PATENT AND TRADEMARK OFFICE
CERTIFICATE OF CORRECTION

PATENT NO. : 5,162,481
DATED : November 10, 1992
INVENTOR(S) : Thomas S. Reid; Charles D. Wright It is certified that error appears in the above-indentified patent and that said Letters Patent is hereby corrected as shown below:

Column 5, line 36, "Kirk-Other" should read -- Kirk-Othmer --.

Column 7, line 5, "ARATION" should read -- PREPARATION --.

Column 12, line 45, after "comprising:" insert -- (a) positioning a patch over said aperture; --

Column 12, line 46 "(a)" should read -- (b) --.

Signed and Sealed this

Fourth Day of January, 1994

Attest:

BRUCE LEHMAN

*Attesting Officer*  *Commissioner of Patents and Trademarks*